March 7, 1933.   C. W. KANOLT   1,900,562
DEPTHOGRAPH CAMERA STAND
Filed May 23, 1930   2 Sheets-Sheet 1
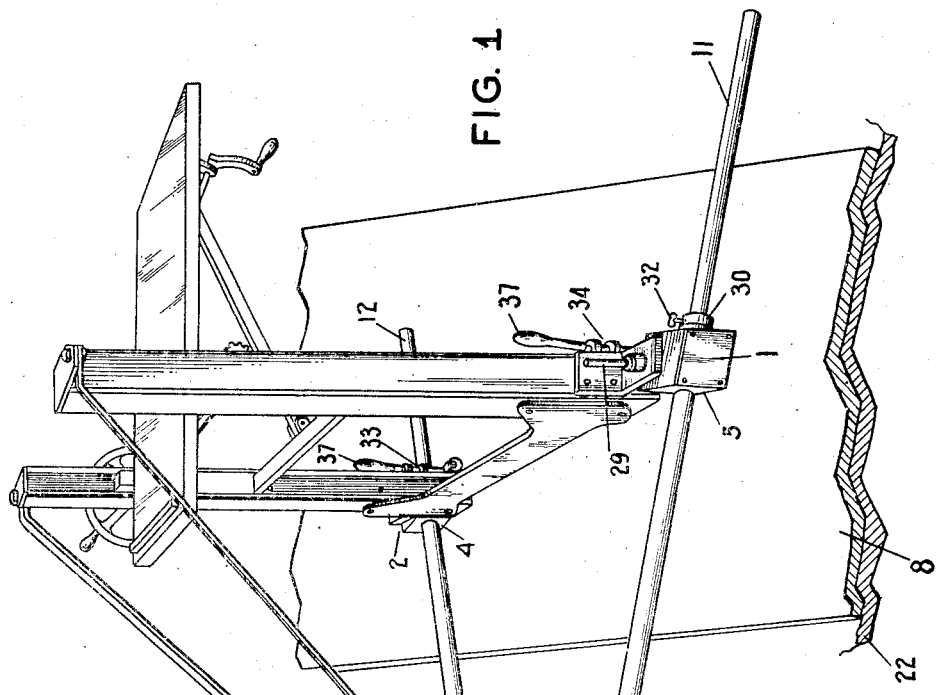
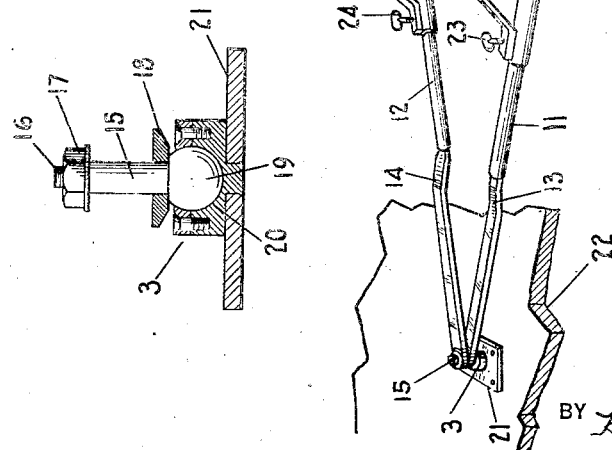
INVENTOR
Clarence W. Kanolt
BY Harry Lea Dodson
ATTORNEY March 7, 1933.  C. W. KANOLT  1,900,562
DEPTHOGRAPH CAMERA STAND
Filed May 23, 1930  2 Sheets-Sheet 2

INVENTOR
Clarence W. Kanolt
BY
ATTORNEY

Patented Mar. 7, 1933

1,900,562

UNITED STATES PATENT OFFICE

CLARENCE W. KANOLT, OF NEW YORK, N. Y.

DEPTHOGRAPH CAMERA STAND

Application filed May 22, 1930. Serial No. 454,563.

My invention relates to that class of cameras designed to be utilized in employing the photographic method described in my United States Patent No. 1,260,682, issued March 26, 1918, and pictures produced by that method I term depthograph pictures. In that patent the camera is described as being mounted on a table which is supported on a base or tripod, this tripod being provided with wheels which may run on a track which is the arc of a circle of which the object to be photographed is the center. The trade-mark "Depthograph" as applied to pictures produced by said patented method, is covered by certificate of registration No. 261,335, issued September 17, 1929.

In carrying out that invention, it was found that it is absolutely necessary that the camera move accurately on an arc of a circle, and that it operate with practically no oscillation or vibration.

My present invention has for its principal object, to provide a construction which will insure the camera moving accurately in the arc of any desired circle.

My invention has for its further object, to insure complete lack of oscillation or vibration during such movement.

A further object of my invention is, to provide means to permit variation of the distance between the camera and the center of rotation.

Another object of my invention is, to provide means for rapidly shifting the position of the camera stand, without being obliged to operate the driving mechanism.

A concrete embodiment of my invention is illustrated in the accompanying drawings, which are to be considered as a part of this specification, in which—

Fig. 1 is a perspective view of my improved depthograph camera stand;

Fig. 2 is a detail view of the pivot therefor;

Similar reference numerals refer to similar parts throughout the entire description.

Figures 3, 4:
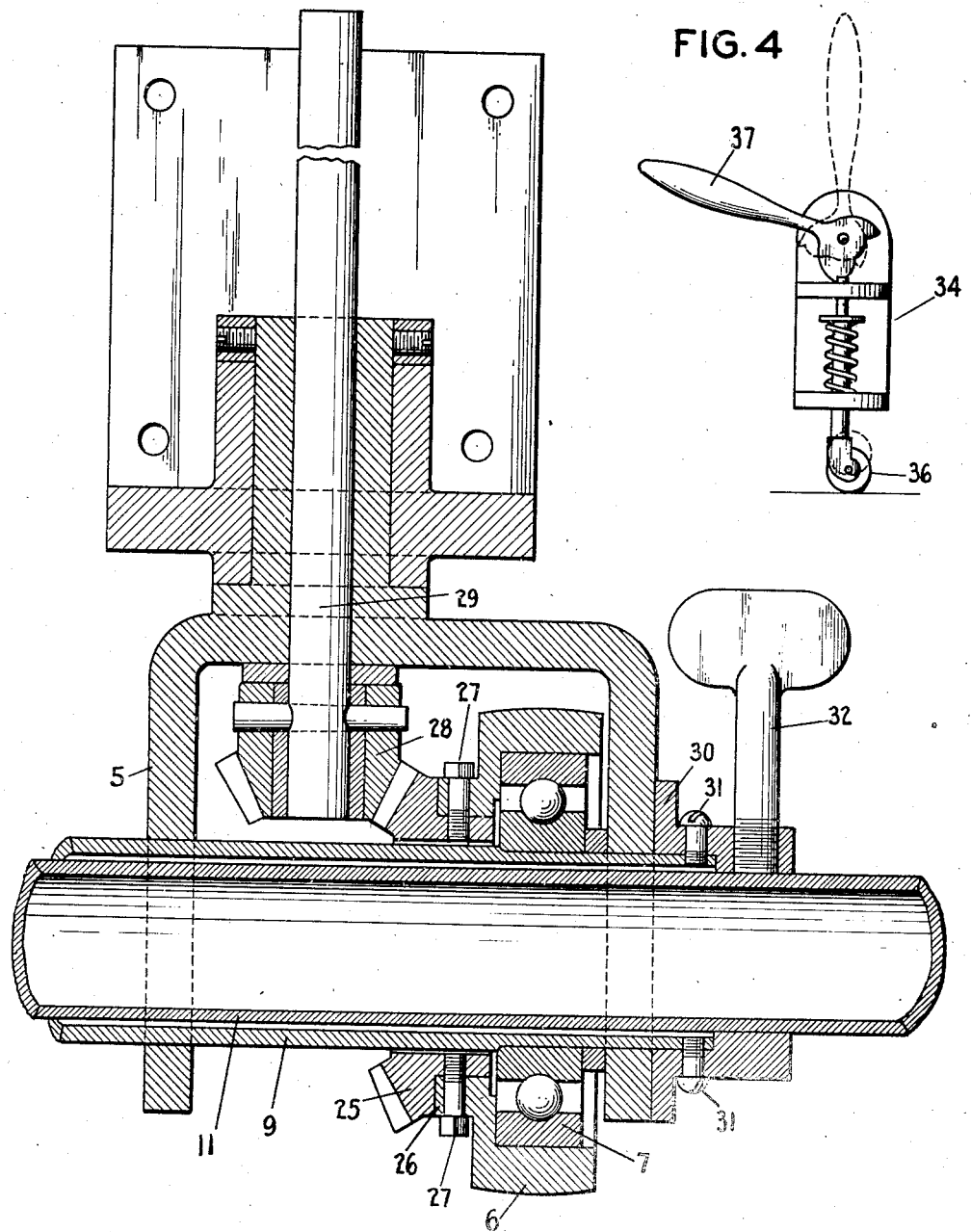
Fig. 3 is an enlarged detail view of the driving gear.
Fig. 4 is a detail view of the means to throw the driving gear out of commission.

As shown in the drawings, the stand is supported at three points, 1, 2, and 3. Points 1 and 2 consist of boxes 4 and 5, in which are mounted wheels 6, which are carried by anti-friction ball bearings 7. The wheels 6 roll upon a steel plate 8, the upper surface of which is smooth. This insures the device rolling thereon with practically no oscillation or vibration. The principle of the three-point support for securing steadiness is well known, so that I have adopted what is practical utility construction for avoiding any tendency to unsteadiness which might produce oscillation or vibration in the device.

The boxes 4 and 5 are mounted on the ends of a pair of outer tubes 9 and 10. The box 5 is rotatable, having a vertical bearing which is attached to the camera stand, so that no matter what the position of the stand relative to the center of rotation, the two wheels can be so rotated that their axes are at right angles to their direction of travel, which will permit them to turn without side-slipping, which would be likely to cause unsteadiness of motion.

Inner tubes 11 and 12 pass through the outer tubes 9 and 10, and are secured to the ends of bars 13 and 14. These bars 13 and 14 are provided with openings adjacent their other ends, so that they can be mounted upon a post 15, the center of which constitutes point 3.

This post 15 is provided with threads 16 on its outer end, on which is mounted a nut 17. A shoulder 18 is provided for the bars 13 and 14 to rest upon, and the post 15 terminates in a ball 19, mounted in a socket 20, which may be secured to a suitable base 21, fastened to the floor 22 by any suitable means. Adjacent the ends of the tubes 9 and 10 are mounted thumbscrews 23 and 24, which engage the rods or inner tubes 11 and 12, to hold them in adjusted position.

Driving mechanism for rotating the stand about point 3 is located in box 5, as clearly seen in Fig. 3. This mechanism consists of a bevel gear 25, which is attached to a laterally extending hub 26 on the wheel 6. As illustrated, this attachment is accomplished through the medium of cap screws 27.

This bevel gear 25 meshes with a bevel pinion 28, which is attached by a pin to a shaft 29 rotated by any suitable or desirable power (not shown). Collars 30 are secured to the ends of the outer tubes 9 and 10, adjacent the boxes 4 and 5, and are secured to said tubes 9 and 10 by means of screws 31, or in any other suitable or convenient manner. Thumbscrews 32 are mounted in the collars 30, and engage the inner tubes 11 and 12, this construction providing for the adjustment of the distance between the camera and point 3. This adjustment is accomplished by loosening the thumbscrews 23, 24, and 32, and sliding the outer tubes 9 and 10 on the inner tubes 11 and 12, either toward or away from the point 3, until the desired radius is attained, when by tightening the thumbscrews 23, 24, and 32, the distance will be maintained.

Obviously, to attempt to roll the camera stand while the wheels 6 are resting on the plate 8, would result in having to move the driving mechanism connected to the rod 29, and this, although of course not impossible, is thoroughly impractical.

I avoid this by providing two jacks 33 and 34, which are secured to the camera stand. The lower ends of these jacks 33 and 34 are equipped with casters 36, of the usual type of construction, whereby the moving of the handles 37 operates to bring the casters 36 down upon the plate 8, and to elevate the camera stand, and therewith the boxes 4 and 5, so that the wheels 6 no longer contact the face of the plate 8. In this position, it is apparent the stand can be conveniently and easily moved, as desired. When the requisite adjustment as to position has been made, the handles 37 are lifted to the position shown in Fig. 1 (and in dotted lines in Fig. 4), which lowers the wheels 6 to rest upon the plate 8, and elevates the casters 36 out of contact therewith. In this manner I insure very convenient and easy adjustment of the camera, regardless of its size and weight.

These jacks 33 and 34 are obviously designed to be used only when returning the camera to its original position after an exposure has been made, or when the stand is to be moved backward or forward in changing the distance of the camera from the point 3.

Having described my invention, what I regard as new, and desire to obtain by Letters Patent of the United States, is:

1. In a stand for a camera for the taking of depthograph pictures, a pair of boxes, wheels mounted therein, anti-friction ball bearings on which said wheels turn, a pair of tubes mounted in said boxes, which tubes converge toward a common center, rods slidably mounted inside of said tubes, bars secured to said rods, the ends of said bars being pivotally secured to a post at said common center, adjustable means to secure the position of said rods in said tubes, a hub on one of said wheels, a bevel gear secured thereto, a bevel pinion in mesh with said gear, a driven shaft to which said pinion is secured, a smooth plane surface on which said wheels run, and manually operable means to space said wheels from said surface.

2. In a stand for a camera for the taking of depthograph pictures, a pair of wheels on which said stand is mounted, a pair of tubes connected to members in which are mounted said wheels, which tubes converge toward a common center, rods slidably mounted inside of said tubes, bars secured to said rods, the ends of said bars being pivotally secured to a post at said common center, adjustable means to secure the position of said rods in said tubes, a hub on one of said wheels, a bevel gear secured thereto, a bevel pinion in mesh with said gear, a driven shaft to which said pinion is secured, a smooth plane surface on which said wheels run, and manually operable means to space said wheels from said surface.

3. In a stand for a camera for the taking of depthograph pictures, a pair of wheels on which said stand is mounted, a pair of tubes connected to members in which are mounted said wheels, which tubes converge toward a common center, rods slidably mounted inside of said tubes, bars secured to said rods, the ends of said bars being pivotally secured to a post at said common center, adjustable means to secure the position of said rods in said tubes, means to rotate one of said wheels, a smooth plane surface on which said wheels run, and manually operable means to space said wheels from said surface.

4. In a stand for a camera for the taking of depthograph pictures, a pair of boxes, wheels mounted therein, a pair of tubes mounted in said boxes, which tubes converge toward a common center, rods slidably mounted inside of said tubes, bars secured to said rods, the ends of said bars being pivotally secured to a post at said common center, a base, a socket in said base, a ball on said post, mounted in said socket, adjustable means to secure the position of said rods in said tubes, a hub on one of said wheels, a bevel gear secured thereto, a bevel pinion in mesh with said gear, a driven shaft to which said pinion is secured, a smooth plane surface on which said wheels run, and manually operable means to space said wheels from said surface.

5. In a stand for a camera for the taking of depthograph pictures, a pair of boxes, wheels mounted therein, a pair of tubes mounted in said boxes, which tubes converge toward a common center, rods slidably mounted inside of said tubes, bars secured to said rods, the ends of said bars being pivotally secured to a post at said common center, adjustable means to secure the position of said rods in said tubes, a hub on one of said wheels, a bevel gear secured thereto, a bevel pinion in mesh with said gear, and a driven shaft to which said pinion is secured.

6. In a stand for a camera for the taking of depthograph pictures, a pair of wheels on which said stand is mounted, a pair of tubes connected to members in which are mounted said wheels, which tubes converge toward a common center, rods slidably mounted inside of said tubes, bars secured to said rods, the ends of said bars being pivotally secured to a post at said common center, adjustable means to secure the position of said rods in said tubes, a hub on one of said wheels, a bevel gear secured thereto, a bevel pinion in mesh with said gear, and a driven shaft to which said pinion is secured.

7. In a stand for a camera for the taking of depthograph pictures, a pair of wheels on which said stand is mounted, a pair of tubes connected to members in which are mounted said wheels, which tubes converge toward a common center, rods slightly mounted inside of said tubes, the ends of said rods being pivotally secured to a post at said common center, adjustable means to secure the position of said rods in said tubes, driven means to rotate one of said wheels, a smooth plane surface on which said wheels run, and manually operable means to space said wheels from said surface.

8. In a stand for a camera for the taking of depthograph pictures, a pair of wheels on which said stand is mounted, a pair of tubes connected to members in which are mounted said wheels, which tubes converge toward a common center, rods slidably mounted inside of said tubes, the ends of said rods being pivotally secured to a post at said common center, adjustable means to secure the position of said rods in said tubes, driven means to rotate one of said wheels, and a smooth plane surface on which said wheels run.

9. In a stand for a camera for the taking of depthogrph pictures, a pair of boxes, one of which is rotatable, secured to the camera stand, wheels mouned in said boxes, a pair of tubes mounted in said boxes, which tubes converge toward a common center, rods slidably mounted inside of said tubes, bars secured to said rods, the ends of said bars being pivotally secured to a post at said common center, adjustable means to secure the position of said rods in said tubes, a hub on the wheel located in the rotatable box, a bevel gear secured thereto, a bevel pinion in mesh with said gear, and a driven shaft to which said pinion is secured.

10. In a stand for a camera for the taking of depthograph pictures, a pair of boxes, one of which is rotatable, secured to the camera stand, wheels mounted therein, anti-friction ball bearings on which said wheels turn, a pair of tubes mounted in said boxes, which tubes converge toward a common center, rods slidably mounted inside of said tubes, bars secured to said rods, the ends of said bars being pivotally secured to a post at said common center, adjustable means to secure the position of said rods in said tubes, a hub on the wheel located in the rotatable box, a bevel gear secured thereto, a bevel pinion in mesh with said gear, a driven shaft to which said pinion is secured, a smooth plane surface on which said wheels run, and manually operable means to space said wheels from said surface.

11. In a stand for a camera for the taking of depthograph pictures, a pair of boxes, one of which is rotatable, secured to the camera stand, wheels mounted therein, a pair of tubes mounted in said boxes, which tubes converge toward a common center, rods slidably mounted inside of said tubes, bars secured to said rods, the ends of said bars being pivotally secured to a post at said common center, a base, a socket in said base, a ball on said post, mounted in said socket, adjustable means to secure the position of said rods in said tubes, a hub on the wheel located in the rotatable box, a bevel gear secured thereto, a bevel pinion in mesh with said gear, a driven shaft to which said pinion is secured, a smooth plane surface on which said wheels run, and manually operable means to space said wheels from said surface.

12. In a stand for a camera for the taking of depthograph pictures, a pair of rotatable boxes, secured to the camera stand, wheels mounted in said boxes, a pair of tubes mounted in said boxes, which tubes converge toward a common center, rods slidably mounted inside of said tubes, bars secured to said rods, the ends of said bars being pivotally secured to a post at said common center, adjustable means to secure the position of said rods in said tubes, a hub on the wheel in one of said boxes, a bevel gear secured thereto, a bevel pinion in mesh with said gear, and a driven shaft to which said pinion is secured.

13. In a stand for a camera for the taking of depthograph pictures, a pair of rotatable boxes, secured to the camera stand, wheels mounted therein, anti-friction ball bearings on which said wheels turn, a pair of tubes mounted in said boxes, which tubes converge toward a common center, rods slidably mounted inside of said tubes, bars secured to said rods, the ends of said bars being pivotally secured to a post at said common center, adjustable means to secure the position of said rods in said tubes, a hub on the wheel located in one of said boxes, a bevel gear secured thereto, a bevel pinion in mesh with said gear, a driven shaft to which said pinion is secured, a smooth plane surface on which said wheels run, and manually operable means to space said wheels from said surface.

14. In a stand for a camera for the taking of depthograph pictures, a pair of rotatable boxes, secured to the camera stand, wheels mounted therein, a pair of tubes mounted in said boxes, which tubes converge toward a common center, rods slidably mounted inside of said tubes, bars secured to said rods, the ends of said bars being pivotally secured to a post at said common center, a base, a socket in said base, a ball on said post, mounted in said socket, adjustable means to secure the position of said rods on said tubes, a hub on the wheel located in one of said boxes, a bevel gear secured thereto, a bevel pinion in mesh with said gear, a driven shaft to which said pinion is secured, a smooth plane surface on which said wheels run, and manually operable means to space said wheels from said surface.

CLARENCE W. KANOLT.